(12) United States Patent
Bienick et al.

(10) Patent No.: US 10,196,851 B2
(45) Date of Patent: Feb. 5, 2019

(54) ENCAPSULATED INSULATED GLASS UNIT

(71) Applicant: Schott Gemtron Corporation, Holland, MI (US)

(72) Inventors: Craig Bienick, Jenison, MI (US); Robert Herrmann, Spring Lake, MI (US); Bret Buxton, Spring Lake, MI (US)

(73) Assignee: SCHOTT GEMTRON CORPORATION, Holland, MI (US)

( * ) Notice: Subject to any disclaimer, the term of this patent is extended or adjusted under 35 U.S.C. 154(b) by 197 days.

(21) Appl. No.: 14/608,877

(22) Filed: Jan. 29, 2015

(65) Prior Publication Data

US 2016/0222717 A1 Aug. 4, 2016

(51) Int. Cl.
*E06B 3/663* (2006.01)

(52) U.S. Cl.
CPC ...... *E06B 3/66309* (2013.01); *E06B 3/66304* (2013.01); *E06B 3/66371* (2013.01); *Y02B 80/22* (2013.01); *Y02B 80/24* (2013.01)

(58) Field of Classification Search
CPC .......... E06B 3/66304; E06B 3/66309; E06B 3/66371; Y02B 80/22; Y02B 80/24
See application file for complete search history.

(56) References Cited

U.S. PATENT DOCUMENTS

| | | | | | |
|---|---|---|---|---|---|
| 2,306,327 A | * | 12/1942 | Baldwin | ............ | E06B 3/66342 52/172 |
| 2,733,789 A | * | 2/1956 | Tolle | ......................... | E06B 3/66 156/107 |
| 3,791,910 A | * | 2/1974 | Bowser | ................... | E06B 3/677 156/109 |
| 3,872,198 A | * | 3/1975 | Britton | ...................... | E06B 3/56 156/109 |
| 4,205,104 A | * | 5/1980 | Chenel | ................ | E06B 3/66328 156/109 |
| 4,393,105 A | * | 7/1983 | Kreisman | ........... | E06B 3/66342 156/104 |
| 4,622,249 A | * | 11/1986 | Bowser | ................... | E06B 3/677 156/109 |
| 4,822,649 A | * | 4/1989 | Canaud | ................. | E06B 3/6621 428/34 |
| 4,951,927 A | * | 8/1990 | Johnston | ................... | E06B 3/20 264/129 |
| 5,061,531 A | * | 10/1991 | Catalano | ................... | E06B 3/20 156/107 |

(Continued)

*Primary Examiner* — Donald J Loney
(74) *Attorney, Agent, or Firm* — Ohlandt, Greeley, Ruggiero & Perle, L.L.P.

(57) ABSTRACT

The insulated glass unit (IGU) of the present disclosure includes two or more glass panels that are spaced apart in a parallel arrangement. The panes define an interior space that is filled with air or other suitable gas, a fluid or liquid, or a vacuum. The IGU is encapsulated to provide a water-tight seal to prevent or minimize water or particles from migrating into the interior space, or to prevent or minimize heat loss. A spacer with a desiccant can be in the interior space. To preserve the structural integrity of the glass panels during encapsulation, a second spacer is placed between the glass panes. The second spacer can be T-shaped so that a narrowed body portion fits between the glass panes. The second spacer can also have a groove therein for storing adhesive and/or desiccant.

10 Claims, 12 Drawing Sheets

(56) References Cited

U.S. PATENT DOCUMENTS

| | | | | |
|---|---|---|---|---|
| 6,216,417 B1 * | 4/2001 | Morin | ................... | A47F 3/0434 |
| | | | | 428/34 |
| 6,228,290 B1 | 5/2001 | Reames et al. | | |
| 2001/0023560 A1 * | 9/2001 | Degelsegger | ..... | B32B 17/10311 |
| | | | | 52/204.1 |
| 2014/0322461 A1 * | 10/2014 | Friedl | ................... | E06B 3/6612 |
| | | | | 428/34 |

* cited by examiner

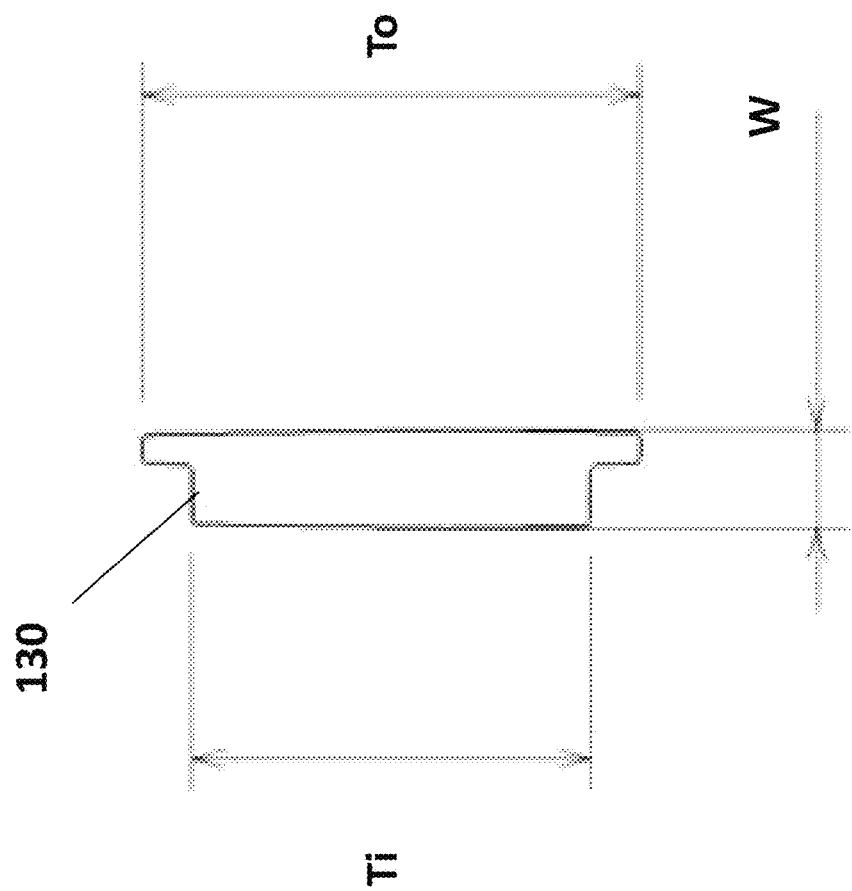

ENCAPSULATED INSULATED GLASS UNIT

BACKGROUND OF THE DISCLOSURE

1. Field of the Disclosure

The present disclosure relates to insulated glass units. More particularly, the present disclosure relates to an encapsulated insulated glass unit with end pieces or frames, and one or more internal components that maintain the structural integrity of the insulated glass unit.

2. Description of the Related Art

An insulated glass unit (IGU) can have two or more spaced apart glass layers. The space between them is filled with air or another suitable gas, or a fluid. This space can provide insulation across the IGU, and prevents heat loss or migration from one side of the IGU to the other. A spacer can be used to maintain the distance or space between the glass layers.

The IGU will, of course, need an end piece or gasket around the edges of the glass layers, to keep the IGU together. Current designs provide for a bracket or similar device to be adhesively applied to the glass layers. This design is problematic in that it still allows for gaps through which air or gas or fluid could pass. Accordingly, there is a need to overcome these deficiencies.

SUMMARY OF THE DISCLOSURE

The insulated glass unit (IGU) of the present disclosure is an assembly having at least two spaced apart glass layers. The glass layers in the IGU have an encapsulated frame. The encapsulated frame provides an effective seal against migration of air and/or fluid, and heat loss. There are no currently available devices that include an IGU with encapsulated frames, and the significant advantages that it provides.

The injecting of the material for the encapsulated frame into a mold and encapsulating the glass layers of the IGU tends to crush, destroy, or damage the glass layers or the spacers used between the glass layers. Accordingly, to assist in the encapsulation process, the present disclosure provides a spacer that resists or withstands the pressures placed on the IGU during encapsulation, and helps to ensure the structural integrity of the IGU.

Thus, in one embodiment, the present disclosure provides an insulated glass unit. The unit comprises a first glass pane having a first edge portion and a second glass pane having a second edge portion with the first glass pane and the second glass pane in parallel spaced arrangement. The unit further comprises a first spacer between the first glass pane and the second glass pane, so that the spacer, the first pane, and the second pane define an interior space. The unit further comprises an encapsulated frame covering the first edge portion and the second edge portion, so that the encapsulated frame forms an air-tight seal with the first glass pane and the second glass pane. The unit can also comprise a second spacer. The second spacer would be covered by the encapsulated frame.

The present disclosure further provides a method of assembling an integrated glass unit. The integrated glass unit comprises a first glass pane having a first edge portion, a second glass pane having a second edge portion, with the first glass pane and the second glass pane in parallel spaced arrangement, and a first spacer between the first glass pane and the second glass pane, so that the spacer, the first pane, and the second pane define an interior space. The method comprises the steps of placing the first spacer between the first glass pane and the second glass pane, so that the first glass pane, the second glass pane, and the first spacer define an interior space, and encapsulating the first glass pane and the second glass pane along the first edge portion and the second edge portion, so that an air-tight seal is formed therebetween.

BRIEF DESCRIPTION OF THE DRAWINGS

FIG. 1a shows dimensional characteristics of a spacer used in the IGU of FIG. 1.

DETAILED DESCRIPTION OF THE DISCLOSURE

Figure 1:
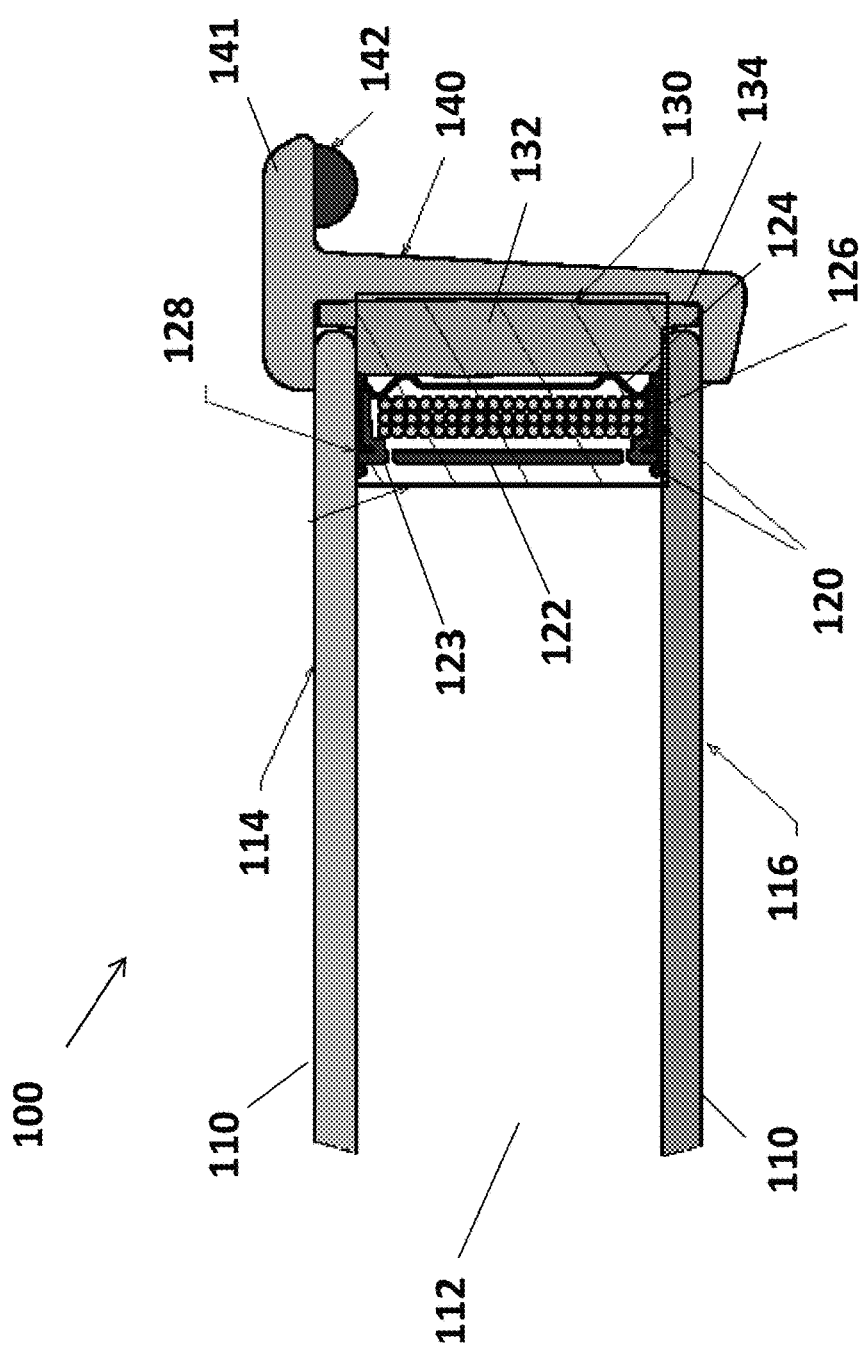
FIG. 1 shows a schematic cross-sectional view of a first embodiment of the IGU of the present disclosure.

Referring to the Figures, and in particular FIGS. 1-5, an IGU assembly of the present disclosure is shown and generally represented by reference numeral 100. Assembly 100 has two or more glass panes 110, an inner spacer 120 and an end cap or T-spacer 130. Glass panes 110 include, in the embodiment shown in FIG. 1, an inner pane 114 and an outer pane 116. Glass panes 110 and inner spacer 120 define interior space 112 of assembly 100. Assembly 100 has a frame 140 that is used with an inner spacer 120, and end cap T-spacer 130 to encapsulate glass panes 110 and interior space 120. Interior space 112 is an empty space filled only with air or other gas, a fluid or liquid, or simply a vacuum. Advantageously, encapsulated frame 140 seals glass panes 110 and interior space 112. This encapsulated structure prevents or greatly minimizes any leaking of air, other gas, fluid, liquid or vacuum in interior space 112. Further, the encapsulated frame 140 maintains insulation against heat loss across the IGU. For example, if assembly 100 is used in a refrigerator or any other location where a liquid or particulate matter, such as, for example, dirt are present, any such liquid or particulate matter that spills on or contacts either pane 114 or 116 of panes 110, will be blocked from leaking into interior space 112. Also, the seal between frame 140 and panes 110 prevents or mitigates heat loss in or out of interior space 112. Furthermore, as described in greater detail below, T-spacer 130 maintains the structural integrity of assembly 100 during encapsulation. This is significant, since it is not possible to encapsulate properly currently available IGUs because the glass panes will not maintain the proper separation.

Referring to the embodiment of FIG. 1, inner pane 114 and outer pane 116 are in parallel spaced arrangement. Inner spacer 120 is located near edges of and between inner pane 114 and outer pane 116. Inner spacer 120 has a thickness corresponding to the desired space or distance between inner pane 114 and outer pane 116.

Inner spacer 120 can have a two-piece design. The design can include an inner component 122 that faces inner space 112, and an outer component 124 that faces in an opposite direction, namely toward T-spacer 130. Inner component 122 and outer component 124 can be adhesively and/or mechanically connected to one another, such as with a snap-fit, pressure-fit, or with mating parts. Inner spacer 120 can also have desiccant 126 in the area between components 122 and 124. Inner component 122 can have one or perforations 123 therein, so that desiccant 126 can be in fluid communication with inner space 112, and help to remove any moisture that accumulates therein.

In one embodiment, inner component 122 is a plastic material, and outer component 124 is metal. The metal can serve as a moisture barrier prohibiting entry into inner space 112. An adhesive 128 can be applied to at least one of inner component 122, outer component 124, inner pane 114 and outer pane 116, to help hold in place spacer 120. One example of the adhesive can be a butyl-based compound. One example of a suitable butyl adhesive is the Delchem® D-2000 adhesive. The present disclosure contemplates other arrangements and types of materials for spacer 120.

As previously discussed, inner spacer 120 will typically not be strong enough to hold inner pane 114 and outer pane 116 at a desired separation should one try to encapsulate the two panes. Also, inner spacer 120 can also be pushed into inner space 112 during encapsulation. Either outcome is unsatisfactory, as the structural integrity of assembly 100 would be compromised. Thus, the present disclosure provides an end cap or T-spacer 130, which is made of a rigid and strong material that can withstand the pressures applied during encapsulation. T-spacer 130 has body 132 and a pair of flanges 134. Body 132 has a thickness substantially corresponding to the desired gap or separation between inner pane 112 and outer pane 114 to fit tightly between the panes. Flanges 134 extend outward so that the length of T-spacer 130 from one flange 134 to the other flange substantially corresponds to the outer thickness of panes 110. As shown in FIG. 1, frame 140 can be encapsulated over T-spacer 130. Flanges 134 provide structural support and also prevent T-spacer 130 from being pushed into interior space 112 during encapsulation.

The dimensions of panes 110, inner spacer 120, and T-spacer 130 are not particularly limited, and can be dictated by the particular application. Referring to FIG. 1a, an outer thickness To, from the end of one flange 134 to the other, can be approximately thirty millimeters. This thickness, To, also corresponds to the outer distance between panes 110. Body 132 of T-spacer can have an inner thickness Ti of approximately twenty-four millimeters. This thickness Ti also corresponds to the inner distance between panes 110, i.e. inner space 112. Inner spacer 120 can have a thickness slightly smaller (i.e., 1 millimeters or less) than Ti. T-spacer 130 can also have a width W of approximately six millimeters. Panes 110 can have a thickness of approximately three millimeters. The tolerances for Ti and To can be +/−0.1 mm and 0.2 mm, respectively.

In the embodiment of FIG. 1, assembly 100 has two glass panes 110, namely inner pane 114 and outer pane 116. The present disclosure contemplates that three or more glass panes 110 can be used in assembly 100. For each pair of adjacent panes 110, there is one inner spacer 120 and one T-spacer 130 between them. When there are three or more panes 110, the encapsulated frame 140 can seal an outermost pane 110 to an innermost pane 110, or can seal adjacent panes 110 to one another. In the context of this disclosure, "inner" means the pane 110 that faces a space that is to be protected or sealed off. The "outer" pane is the pane 110 that faces the ambient environment. In embodiments where there are three or more panes 110, all panes 110 that are not an inner pane or an outer pane are referred to as an intermediate pane 110.

Figure 1B:
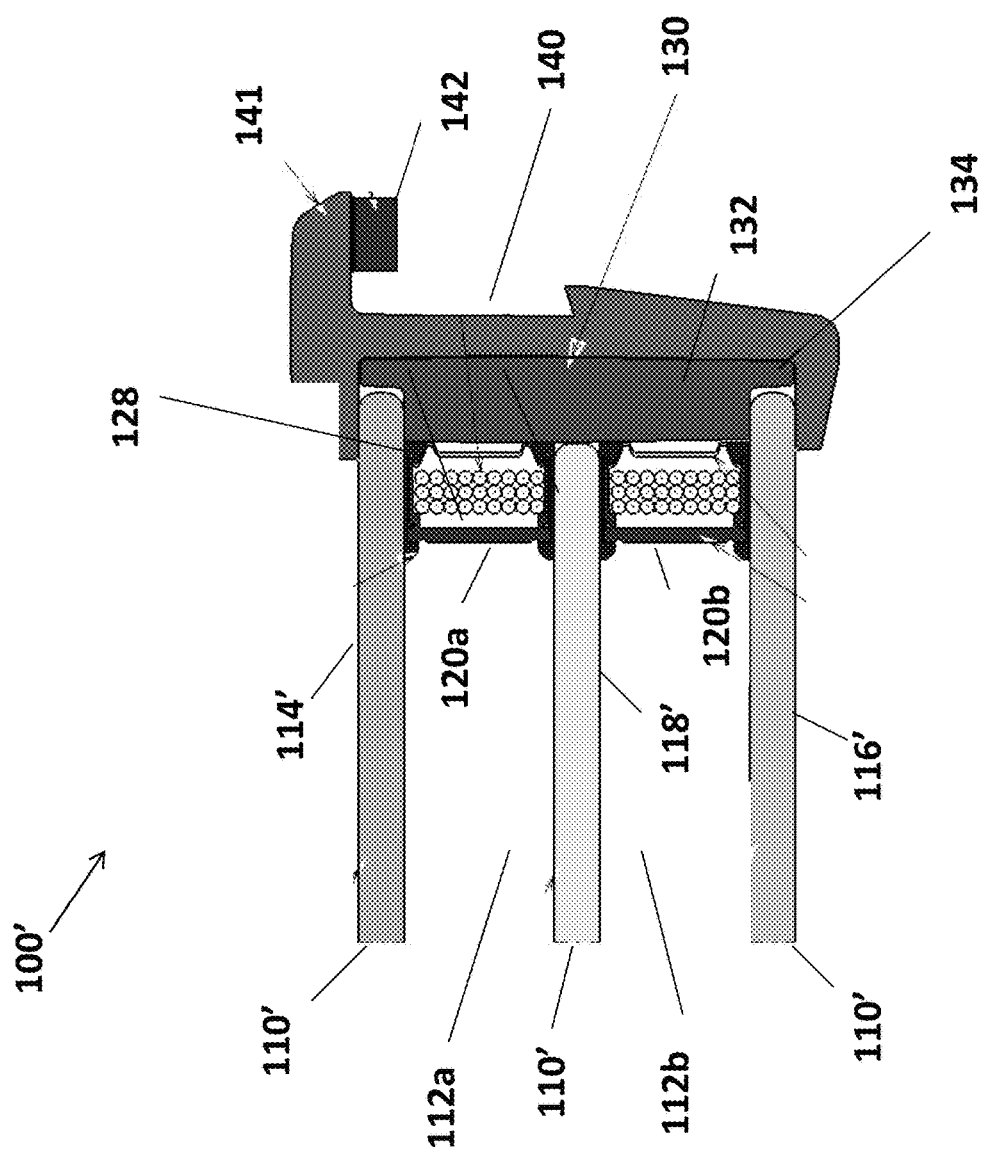
FIG. 1b shows a schematic cross-sectional view of a second embodiment of an IGU of the present disclosure

An alternative embodiment of the IGU assembly of the present disclosure is shown in FIG. 1b, and referred to by numeral 100'. Assembly 100' has three panes 110', specifically inner pane 114', outer pane 116' and intermediate pane 118'. Thus, there are two separate inner spaces, 112a and 112b. Intermediate pane 118' is slightly shorter than inner pane 114' and outer pane 116', so that T-spacer 130 still fits between inner pane 114' and outer pane 116' as shown. Assembly 100' also has two inner spacers. One inner spacer 120a is between inner pane 114' and intermediate pane 118', and a second inner spacer 120b is between intermediate pane 118' and outer pane 116'. Each of spacers 120a and 120b are similarly structured as spacer 120 of assembly 100, and can be held in place by adhesive 128. As is also shown in FIG. 1b, T-spacer 130, with body 132 and flanges 134, is the same as T-spacer 130 from assembly 100. Likewise, encapsulation frame 140, with lip 141 and seal 142, is the same as frame 140 used in assembly 100, discussed below.

T-spacer 130 is made of material that is rigid and strong enough to withstand the pressures applied when frame 140 is applied. In one embodiment, T-spacer 130 is a solid, unitary component. In another embodiment shown in FIG. 5A and discussed below, T-spacer 130 can be made of two separate pieces that are removably or permanently connected to one another. T-spacer 130 can also be at least partially hollow. T-spacer 130 may also have splines or ridges (not shown) on exterior or interior surfaces, to provide additional mechanical stability and strength. Suitable materials for T-spacer 130 can be a plastic that is easily moldable into the desired shape. Examples of such plastics are nylon, propylene, polyvinyl chloride, polycarbonate, and acrylonitrile butadiene styrene (ABS), or mixtures thereof. Of these plastics, ABS can be particularly suitable, as it is strong and does not shrink significantly when heat is applied. Polyvinyl chloride also has favorable strength characteristics, but can be a difficult material to work with when molding and subjected to heat. A blowing or foaming agent can be added to the plastic material of T-spacer 130, to provide a cellular structure for additional strength. One suitable family of foaming agents for ABS is the SAFOAM® product line, sold by Reedy International.

Figure 2:
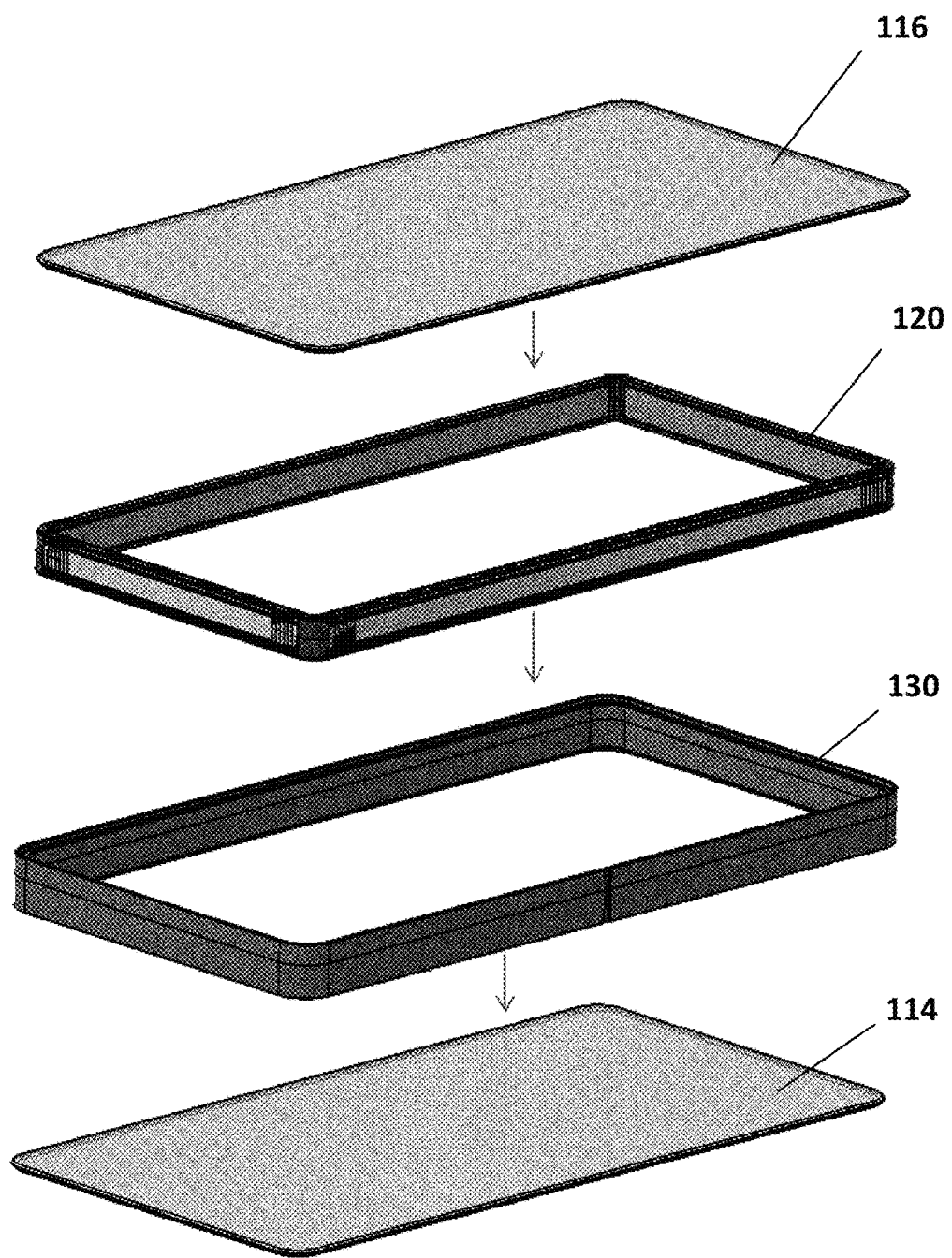
FIGS. 2-5 show process steps for assembling the IGU of FIG. 1.
Figure 3:
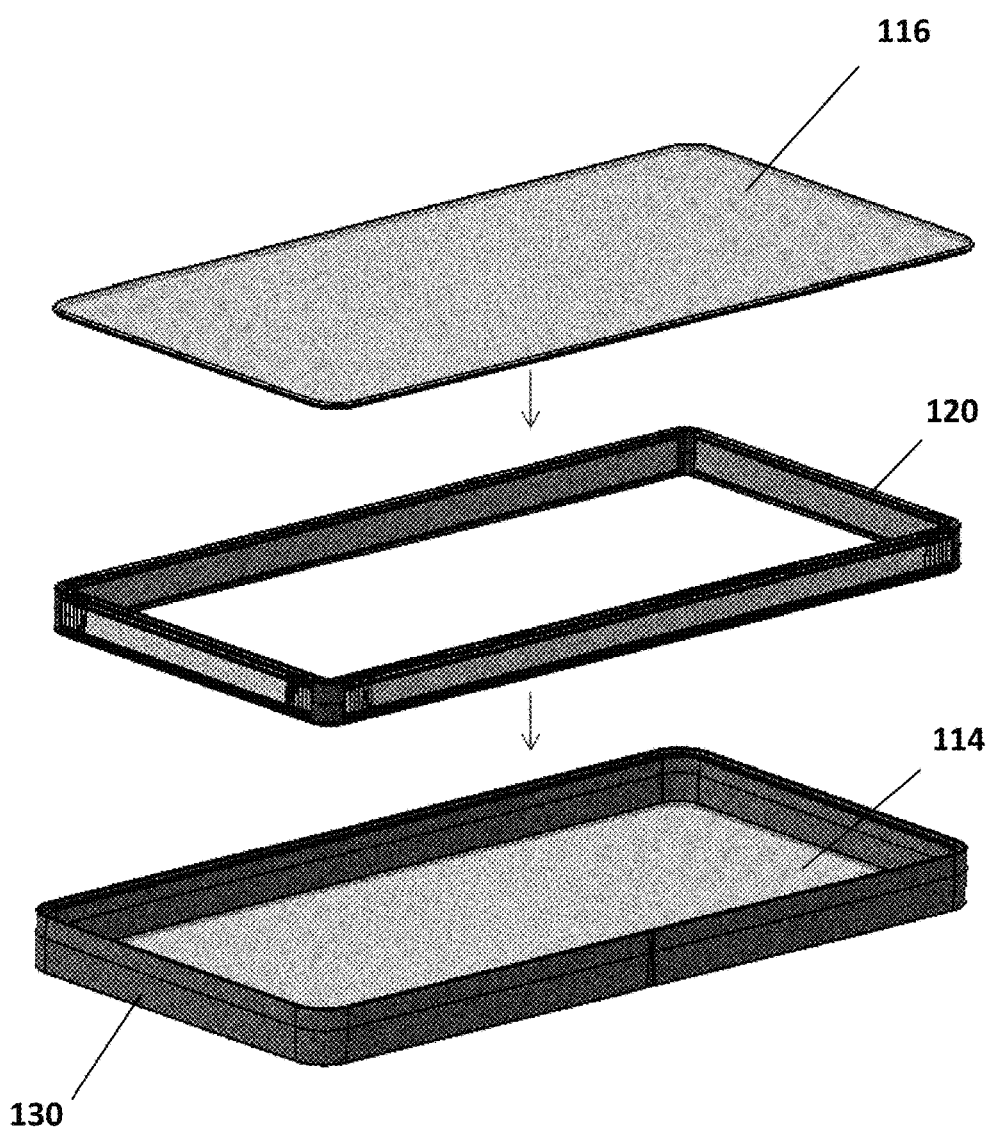
Figure 4:
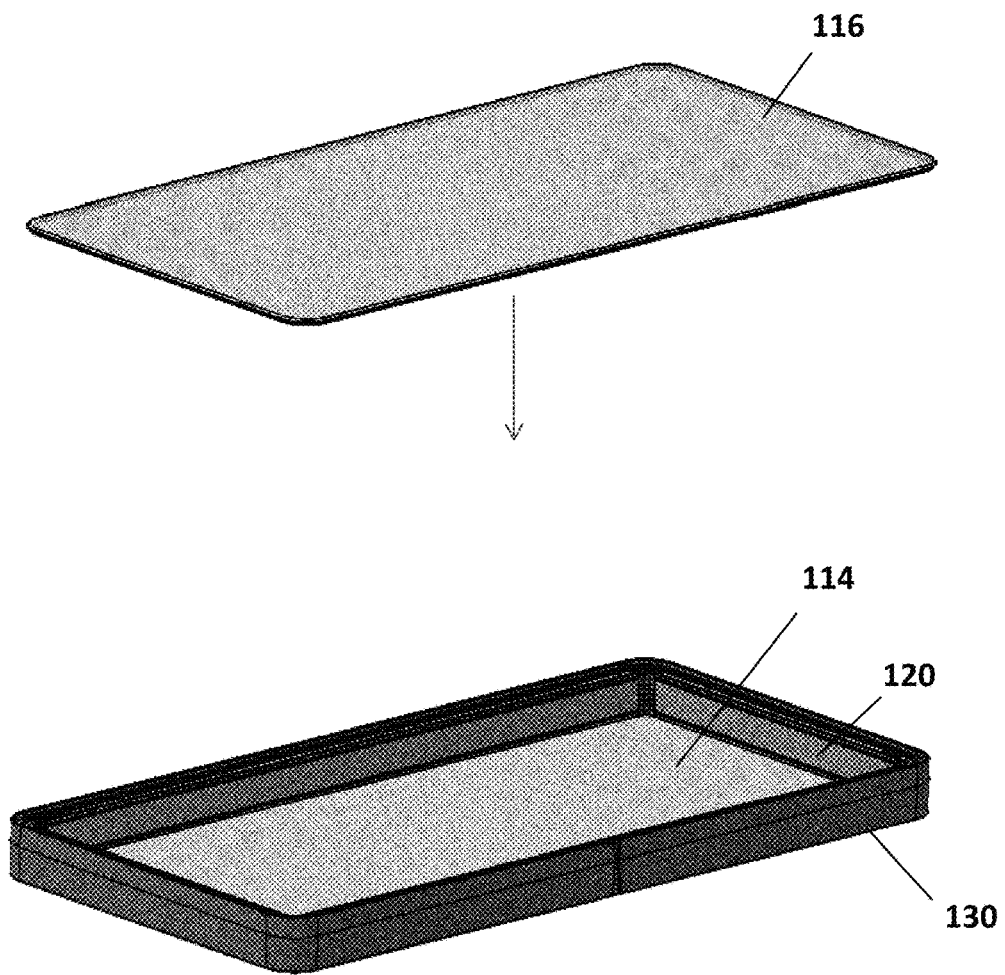

Referring to FIGS. 2-5, a process for the assembly of assembly 100 of FIG. 1 is shown. FIG. 2 shows an exploded view of inner pane 114, outer pane 116, inner spacer 120, and T-spacer 130. As shown in FIG. 3, inner pane 114 fits within the inner perimeter of and is connected to T-spacer 130. Inner spacer 120 is then placed in the inner perimeter of T-spacer 130. Referring to FIG. 4, outer pane 116 is then placed in the inner perimeter of and connected to T-spacer 130. This layered arrangement of panes 110, inner spacer 120 and T-spacer 130 forms sub-assembly 102, shown in FIG. 5.

Figure 5:
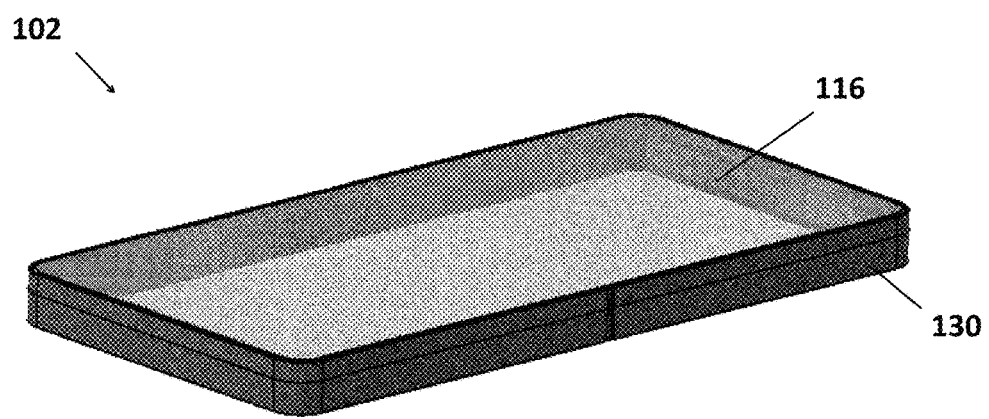
Figure 5A:
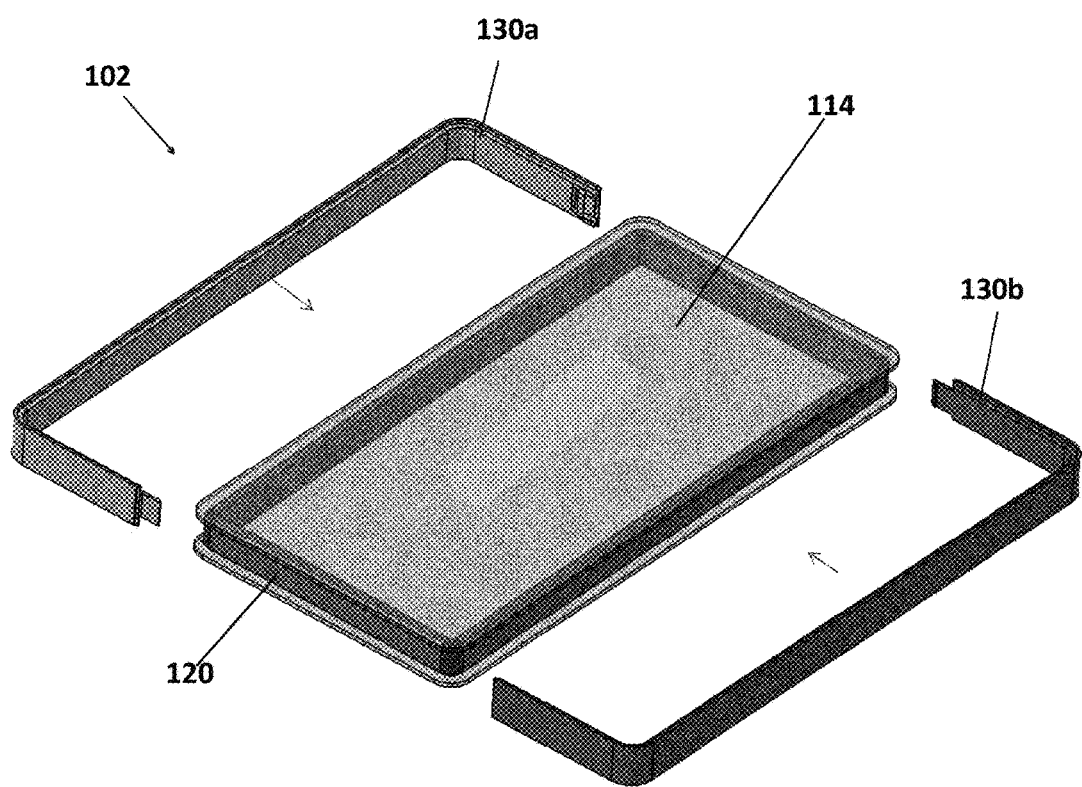
FIGS. 5a-5c show an alternative embodiment of a T-spacer that can be used in the IGU of FIG. 1, or the process of FIGS. 2-5.
Figure 5B:
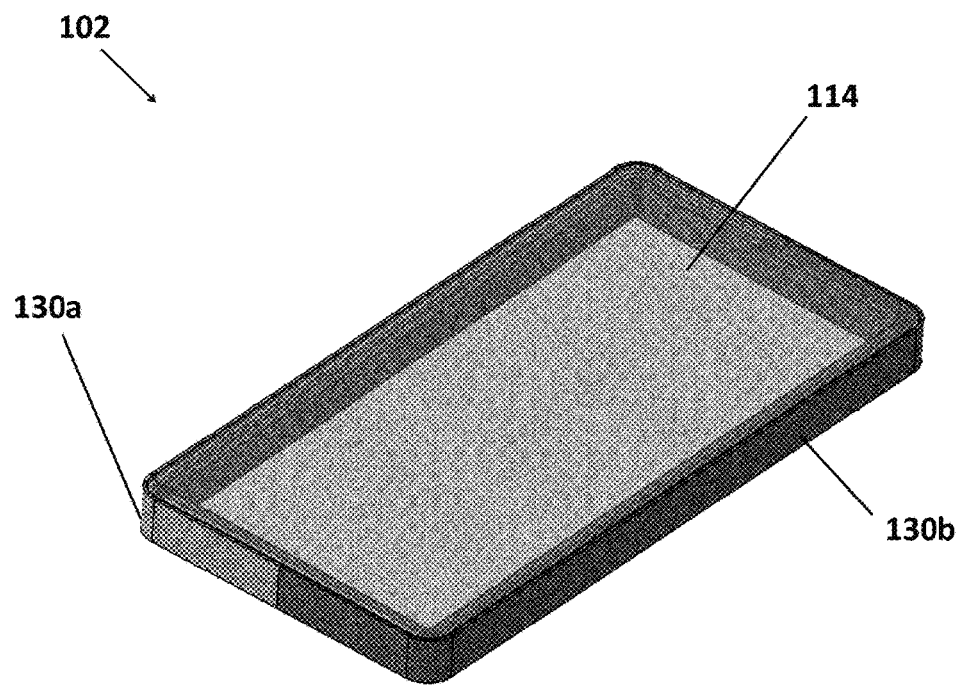
Figure 5C:
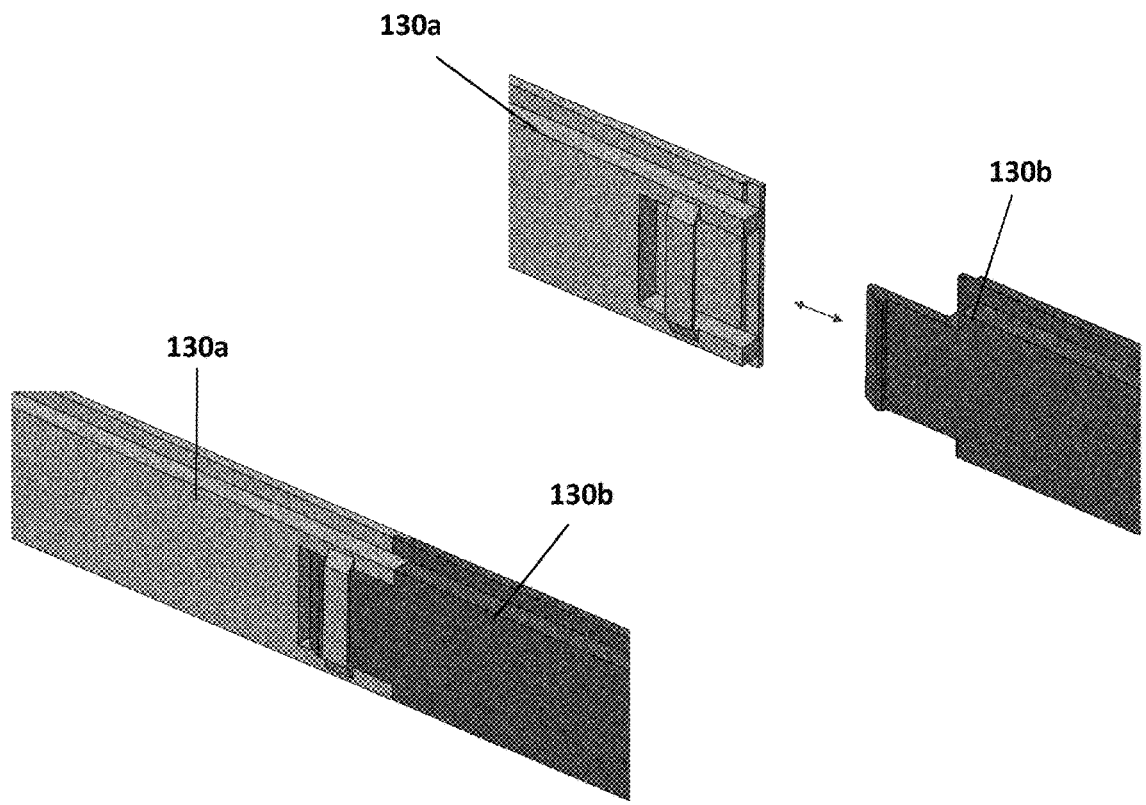

FIGS. 5A-5C show a two-piece T-spacer 130 noted above. In this embodiment, T-spacer 130 has first half 130a and second half 130b. In lieu of or in conjunction with the assembly process described above and shown in FIGS. 2-5, components 130a and 130b can be connected to one another after the first pane 114, second pane 116, and inner spacer 120 are layered together in place. Thus, in this embodiment, T-spacer 130 surrounds the perimeter of panes 114 and 116, and inner spacer 120. In this embodiment, first half 130a and second half 130b are removably connected to one another with a snap-fit tongue and groove connection. However, the present disclosure contemplates other ways of removably, or permanently, connecting first half 130a and second half 130b, such as with an adhesive or bonding material.

Once sub-assembly 102 is formed, it can then be placed in a mold (not shown), where encapsulated frame 140 is molded around or about the exterior of sub-assembly 102, including along the edge portions of panes 110. Suitable materials for the encapsulant of frame 140 include plastics such as poly propylene or polyvinyl chloride. The plastic used for encapsulated frame 140 should have an elasticity to it, to help ensure that panes 110 do not break.

Frame 140 can also have a lip portion 141 formed therein, with a seal or gasket 142 thereon. This lip 141 and/or seal 142 can provide convenient installation of assembly 100 for the application of use. One suitable application for assembly 100 (as well as assemblies 200 and 300, discussed below) is in refrigeration applications where it is desirable to prevent or mitigate heat loss from one side of assembly 100 to the other. The assemblies of the present disclosure may also be used in other home appliances, in architectural windows, and any other residential or commercial application where it is desires to mitigate heat loss across a glass pane.

Panes 110 can be connected to T-spacer 130 in any way suitable to ensure that an air-tight seal is maintained after frame 140 is molded on. For example, panes 110 can be connected to T-spacer 130 with a snap-fit or friction-fit, or with the use of an adhesive. As previously discussed, inner spacer 120 can be connected to panes 110 with an adhesive. Panes 110, inner spacer 120, and T-spacer 130 can also be laid on top of one another without any mechanical or adhesive connection. In this embodiment, the encapsulation provided by frame 140 will hold the components of assembly 100 rigidly in place.

In the embodiment of FIGS. 1-5, assembly 100 has a rectangular shape, with rounded corners. Other shapes are contemplated, such as square, triangular, polygonal, or circular. As discussed above, T-spacer 130 can be a single-piece or unitary, molded component or can be made of separate individual components that are connected together to form T-spacer 130. Inner spacer 120 can also be one or more than one components that are connected together. Concerning inner spacer 120, for example in the embodiment shown in FIGS. 1-5, inner spacer 120 has four separate sections along its length and width that are joined together at rounded corners.

Figure 6:
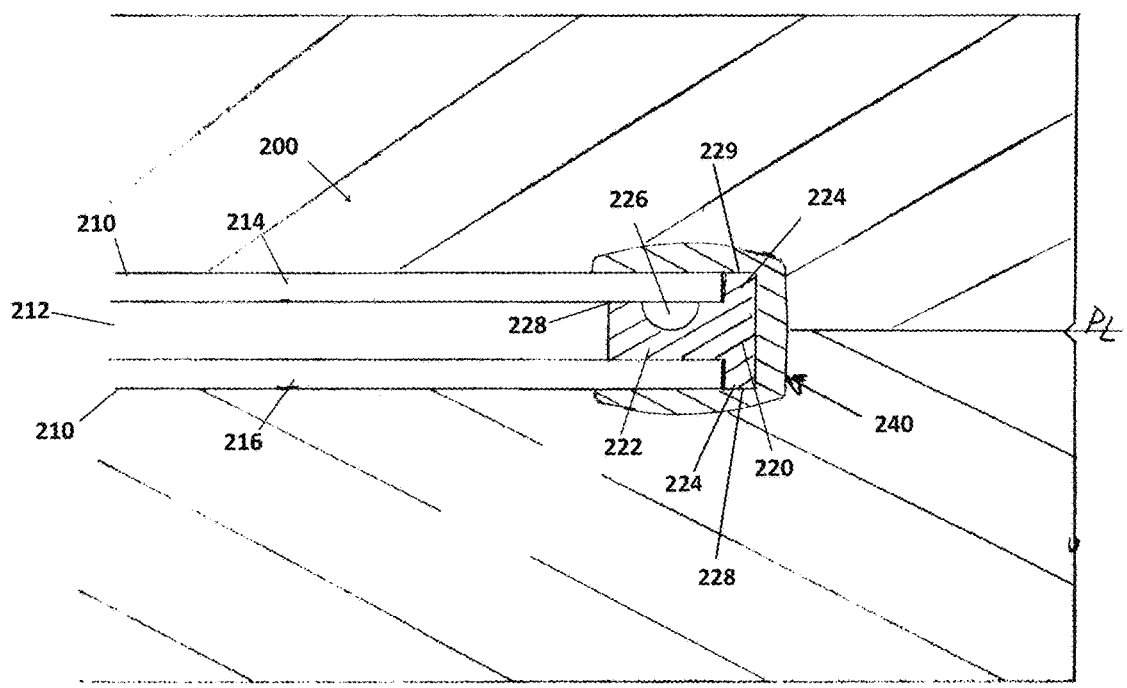
FIG. 6 shows a schematic cross-sectional view of a third embodiment of the IGU of the present disclosure.

Referring to FIG. 6, a third embodiment of an IGU of the present disclosure is shown and referred to by reference numeral 200. Assembly 200 has two panes 210, namely inner pane 214 and outer pane 216, and insert 220, all of which define an interior space 212. Assembly 200 also has encapsulated frame 240. Insert 220 can have a similar shape and cross-sectional profile as T-spacer 130 of assembly 100 but with the differences described below.

Insert 220 has a main body portion 222, a pair of flanges 224, and groove 226 formed in body 222. Body 222 has a thickness substantially conforming to the gap or area between panes 214 and 216. The distance from an end 228 of one of the pair of flanges 224 to the other end 229 of the pair of flanges 224 substantially corresponds to the outer thickness of panes 214 and 216. Insert 220 acts similar to T-spacer 130 in assembly 110, and thus can have a somewhat similar shape to that of T-spacer, namely a molded piece that is located around a perimeter of assembly 200.

Groove 226 can be carved or formed into body 222. The purpose of groove 226 is that desiccant and/or adhesive (not shown) can be placed therein. In one embodiment, a liquid adhesive having a desiccant therein is placed in groove 226. The adhesive connects one or more panes 210 to body 222 and insert 220. Groove or grooves 226 can be positioned or formed on one or both sides of body 222. Also, groove 226 can be a continuous groove that is formed along an entire perimeter of insert 220, or can be one or more discrete and grooves at separate locations on the perimeter of insert 220. Further, there can be one or more locations on insert 220 where there is a small clearance or relief 228 between body 222 and one of panes 210, where the thickness of insert 220 is slightly less than the gap or area between panes 210. This allows for fluid communication between the desiccant in groove 226 and interior space 212.

With the exceptions discussed above, assembly 200 and the components thereof function and are assembled in a similar fashion to those of assembly 100. Also, spacer 220 can be made of the same materials as discussed above with respect to T-spacer 130.

Figure 7:
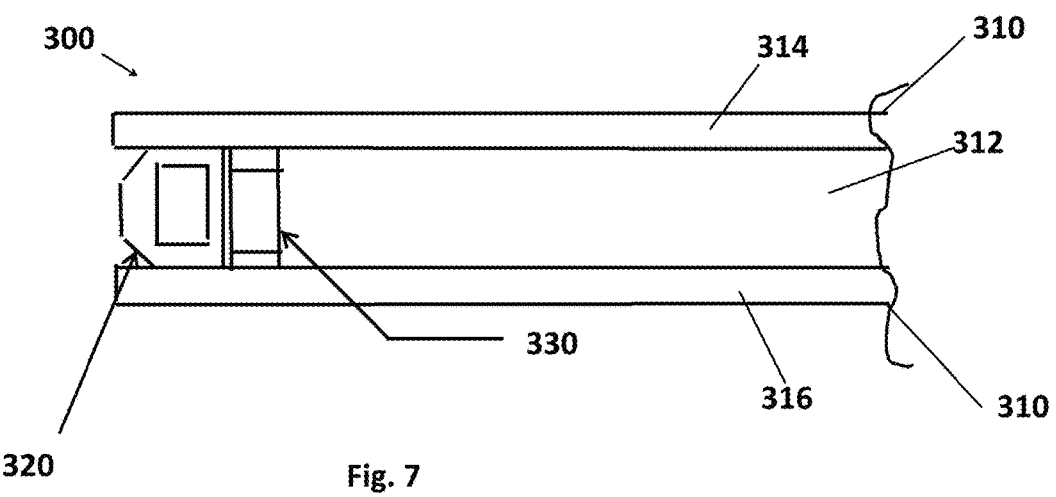
FIG. 7 shows a schematic cross-sectional view of a fourth embodiment of the IGU of the present disclosure.
Figure 8:
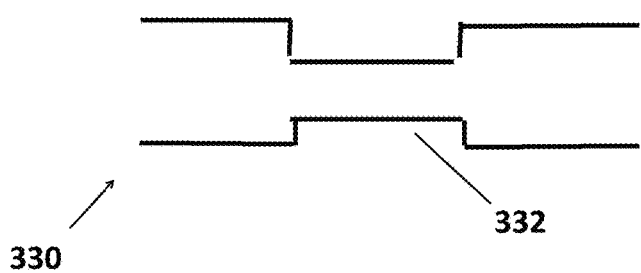
FIG. 8 shows a schematic cross-section of a spacer used in the IGU of FIG. 7.

Referring to FIGS. 7 and 8, a fourth embodiment of an IGU of the present disclosure is shown and referred to by numeral 300. Assembly 300 has two panes 310, namely inner pane 314 and outer pane 316. Assembly 300 also has inner spacer 320, which functions in a similar fashion to inner spacer 120 of assembly 100.

Assembly 300 also has a crush-proof ring or spacer 330. Spacer 330 is a ring or loop that is in inner space 312. Spacer 330 can also be wrapped around inner spacer 320. As shown in FIG. 8, spacer 330 can have stepped gaps or areas 332 of a slightly reduced diameter. These gaps 332 allow for fluid communication between the desiccant in inner spacer 320 and inner space 312. As discussed above with respect to assemblies 100 and 200, a frame (not shown) can be encapsulated over panes 310, inner spacer 320 and ring 330. Assembly 300 has the advantages of being easy to manufacture and assemble, while still providing strength to ensure the integrity of assembly 300 during and after the encapsulation process.

Spacer 330 can be made of a very rigid and strong plastic material, which may be stronger than inner spacer 320. In this way, spacer 330 would resist the pressures applied during encapsulation of assembly 300 to maintain the structural integrity of assembly 300. In one embodiment, spacer 330 is made of polyvinyl chloride. Other suitable plastics for spacer 330 include nylon, propylene, polycarbonate, and acrylonitrile butadiene styrene. Spacer may also be made of metallic materials such as aluminum or zinc. A depth of gaps 332 can be about 0.1 mm, and they can be spaced around the circumference of spacer 330 at intervals of approximately 25 mm. The outer diameter of spacer 330 would correspond to the gap between panes 310. The thickness or width of spacer 330 could be approximately 10 mm.

While the present disclosure has been described with reference to one or more particular embodiments, it will be understood by those skilled in the art that various changes can be made and equivalents can be substituted for elements thereof without departing from the scope thereof. In addition, many modifications can be made to adapt a particular situation or material to the teachings of the present disclosure without departing from the scope thereof. Therefore, it is intended that the present disclosure not be limited to the particular embodiment(s) disclosed as the best mode contemplated for carrying out this disclosure.

The invention claimed is:
1. An insulated glass unit comprising:
a first glass pane having a first edge;
a second glass pane having a second edge, wherein the first glass pane and the second glass pane are in a parallel spaced arrangement;

a first spacer between the first glass pane and the second glass pane so that the first spacer, the first pane, and the second pane define an interior space;

a rigid plastic second spacer; and a plastic frame that is formed by injection molding to encapsulate the first edge and the second edge so that the plastic frame forms an air-tight seal with the first glass pane and the second glass pane, wherein the second spacer is covered by the plastic frame and has a T-shape with an inner body portion and an exterior flange portion, so that the inner body portion is between the first glass pane and the second glass pane, and the exterior flange portion contacts the first edge and the second edge of the first glass pane and the second glass pane, wherein the plastic frame covers the second spacer at a first surface of the plastic frame, and the plastic frame has an outer surface that is opposite the first surface, and the plastic frame has a lip projecting from the outer surface, wherein the lip is comolded with the plastic frame.

2. The insulated glass unit of claim 1, wherein the inner body portion comprises a groove therein, and wherein in the groove is a material selected from the group consisting of an adhesive, a desiccant, and a mixture thereof.

3. The insulated glass unit of claim 1, wherein the second spacer is made from a plastic comprising propylene, polyvinyl chloride, polycarbonate, acrylonitrile butadiene styrene, a metallic material and any mixtures thereof.

4. The insulated glass unit of claim 1, wherein the first spacer has a desiccant therein.

5. A method of assembling the insulated glass unit of claim 1, the method comprising the steps of:

placing the first spacer between the first glass pane and the second glass pane so that the first glass pane, the second glass pane, and the first spacer define an interior space;

placing the second spacer between the first glass pane and the second glass pane; and encapsulating the first glass pane and the second glass pane along the first edge and the second edge so that an air-tight seal is formed therebetween.

6. The insulated glass unit of claim 1, wherein the plastic frame is made from a plastic selected from the group consisting of poly propylene, polyvinyl chloride, and a combination thereof.

7. The insulated glass of claim 1, wherein the second spacer is a single-piece, unitary component.

8. An insulated glass unit comprising:

a first glass pane having a first edge;

a second glass pane having a second edge, wherein the first glass pane and the second glass pane are in a parallel spaced arrangement;

a rigid plastic spacer between the first glass pane and the second glass pane; and a plastic frame that is formed by injection molding to encapsulate the first edge and the second edge so that the plastic frame forms an air-tight seal with the first glass pane and the second glass pane, wherein the spacer is covered by the plastic frame and has a T-shape with an inner body portion and an exterior flange portion, so that the inner body portion is between the first glass pane and the second glass pane, and the exterior flange portion contacts the first edge and the second edge of the first glass pane and the second glass pane, wherein the plastic frame covers the second spacer at a first surface of the plastic frame, wherein the plastic frame has an outer surface that is opposite the first surface, wherein the plastic frame has a lip projecting from the outer surface, and wherein the lip is comolded with the plastic frame.

9. The insulated glass unit of claim 8, wherein the spacer is made from a plastic comprising propylene, polyvinyl chloride, polycarbonate, acrylonitrile butadiene styrene, a metallic material and any mixtures thereof.

10. An insulated glass unit comprising:

a first glass pane having a first edge;

a second glass pane having a second edge, a third glass pane between the first glass pane and the second glass pane, and having a third edge, wherein the first glass pane, the second glass pane, and the third glass pane are in a parallel spaced arrangement;

a first spacer between the first glass pane and the third glass pane so that the first spacer, the first glass pane, and the third glass pane define a first interior space;

a second spacer between the second glass pane and the third glass pane so that the second spacer, the second glass pane, and the third glass pane define a second interior space;

a rigid plastic third spacer; and a plastic frame that is formed by injection molding to encapsulate the first edge and the second edge so that the plastic frame forms an air-tight seal with the first glass pane and the second glass pane, wherein the third spacer is covered by the plastic frame and has a T-shape with an inner body portion and an exterior flange portion, so that the inner body portion is between the first glass pane and the second glass pane and contacts the third edge, and the exterior flange portion contacts the first edge and the second edge of the first glass pane and the second glass pane respectively, wherein the plastic frame covers the second spacer at a first surface of the plastic frame, and the plastic frame has an outer surface that is opposite the first surface, and the plastic frame has a lip projecting from the outer surface, wherein the lip is comolded with the plastic frame.

* * * * *